United States Patent
Iyengar

(10) Patent No.: US 7,024,409 B2
(45) Date of Patent: Apr. 4, 2006

(54) SYSTEM AND METHOD FOR TRANSFORMING DATA TO PRESERVE PRIVACY WHERE THE DATA TRANSFORM MODULE SUPPRESSES THE SUBSET OF THE COLLECTION OF DATA ACCORDING TO THE PRIVACY CONSTRAINT

(75) Inventor: Vijay S. Iyengar, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 10/123,777

(22) Filed: Apr. 16, 2002

(65) Prior Publication Data

US 2003/0208457 A1    Nov. 6, 2003

(51) Int. Cl.
 *G06F 17/30* (2006.01)
(52) U.S. Cl. .......................... 707/9; 707/100; 707/200
(58) Field of Classification Search ................ 707/1–2, 707/100–102, 200–204, 8–9; 711/133–138, 711/160–167; 725/34–38; 709/210–215, 709/220–225; 713/200–202
See application file for complete search history.

(56) References Cited

U.S. PATENT DOCUMENTS

| | | | | |
|---|---|---|---|---|
| 5,045,853 A * | 9/1991 | Astle et al. | ................... | 341/67 |
| 5,408,657 A * | 4/1995 | Bigelow et al. | ............ | 707/100 |
| 5,491,629 A * | 2/1996 | Fox et al. | ....................... | 702/3 |
| 5,708,828 A * | 1/1998 | Coleman | .................... | 715/523 |
| 5,751,949 A * | 5/1998 | Thomson et al. | ........... | 713/201 |
| 5,801,688 A * | 9/1998 | Mead et al. | ................. | 345/700 |
| 6,112,194 A * | 8/2000 | Bigus | .......................... | 706/11 |
| 6,144,966 A * | 11/2000 | Roberts | ....................... | 707/101 |
| 6,275,824 B1 * | 8/2001 | O'Flaherty et al. | ............ | 707/9 |
| 6,388,592 B1 * | 5/2002 | Natarajan | .................... | 341/107 |
| 6,480,850 B1 * | 11/2002 | Veldhuisen | .................... | 707/9 |
| 6,513,065 B1 * | 1/2003 | Hafez et al. | ................. | 709/224 |
| 6,560,541 B1 * | 5/2003 | Singh | .......................... | 702/19 |
| 6,564,174 B1 * | 5/2003 | Ding et al. | ................. | 702/186 |
| 6,691,067 B1 * | 2/2004 | Ding et al. | ................. | 702/186 |
| 6,728,703 B1 * | 4/2004 | Wan et al. | ...................... | 707/3 |
| 6,751,663 B1 * | 6/2004 | Farrell et al. | ............... | 709/224 |
| 2001/0011247 A1 * | 8/2001 | O'Flaherty et al. | ............ | 705/39 |
| 2001/0056410 A1 * | 12/2001 | Ishigaki | ....................... | 705/67 |
| 2002/0010679 A1 * | 1/2002 | Felsher | ........................ | 705/51 |
| 2002/0124253 A1 * | 9/2002 | Eyer et al. | .................... | 725/34 |

(Continued)

FOREIGN PATENT DOCUMENTS

GB    2376318    * 12/2002    .................... 17/60

(Continued)

OTHER PUBLICATIONS

Latanya.S, k-Anonymity: a model for protecting privacy, international journal on uncertainity, Fuzziness and knowledge-based system 10(5), 2002, pp1-14.*

(Continued)

*Primary Examiner*—Srirama Channavajjala
(74) *Attorney, Agent, or Firm*—F. Chau & Associates, LLC

(57) ABSTRACT

A data transform system comprises a processor, a memory connected to the processor, storing a collection of data, and a data transform module, accepting two data constraints and the collection of data from memory, wherein a first constraint is a usage constraint and a second constraint is a privacy constraint, the data transform module transforming the collection of data according to the usage constraint and the privacy constraint.

25 Claims, 6 Drawing Sheets

U.S. PATENT DOCUMENTS

| | | | |
|---|---|---|---|
| 2002/0178151 A1* | 11/2002 | Chaudhuri et al. | 707/3 |
| 2003/0041042 A1* | 2/2003 | Cohen et al. | 706/45 |
| 2003/0145000 A1* | 7/2003 | Arning et al. | 707/3 |
| 2003/0145004 A1* | 7/2003 | Egilsson et al. | 707/6 |
| 2003/0149744 A1* | 8/2003 | Bierre et al. | 709/217 |
| 2003/0212851 A1* | 11/2003 | Drescher et al. | 711/100 |

FOREIGN PATENT DOCUMENTS

| | | | |
|---|---|---|---|
| WO | WO 02/093378 A1 * | 11/2002 | 11/30 |
| WO | WO 03/021473 A1 * | 3/2003 | |

OTHER PUBLICATIONS

Lawrence H. C0x, national center for health statistics, DIMACS working group on challenges for Cryptographers in Health Data privacy, DIMACS, Rutgers University, Jun. 30,2004.*

Fred M Behlen et al. Multicenter Patient records research, security policies and tools, JAMIA, Nov. 1999 6(6), 17 pages.*

Adam Meyerson et al. General k-Anonymization is Hard, CMU-CS-03-113, Mar. 2003, pp 1-4.*

Suhail Ansari et al. "integrating E-commerce and data mining: architecture and challenges", ICDM '01: the 2001 IEEE international conference on daa mining, 2001., 8 pages.*

Rakesh Agrawal et al. "Hippocratic databases", proceedings of the 28th VLDB conference, 2002, 12 pages.*

Vijay S Iyengar, "Transforming data to satisfy privacy constraints", SIGKDD, '02, ACM, pp 279-288.*

Shariq J.Rizvi et al. "Maintaining data privacy in association rule mining", proceedings of the 28th VLDB conference, 2002 12 pages.*

MartinS.Oliver "database privacy: balancing confidentiality, integrity and availability", vol. 4, issue 2, Dec. 2002, pp 20-27.*

Lingyu Wang et al. "securing OLAP data cubes against privacy breaches", proceedings of the 2004 IEEE symposium on security and privacy (S&P'04), 15 pages.*

Rakesh Agarawal, et al. "report on DIMACS*working group on privacy/confidentiality of health data", Dec. 2003, pp 1-19.*

Praveen guduru et al. "user interfaces for privacy agents", Aug. 2, 2004, pp 1-43.*

Security and privacy requirements analaysis tool (SPRAT), software requirements specification version 2.00 Jul. 12, 2004, 28 pages.*

Daniel E Geer,Jr, Verdasys,Inc, "securing the point of use the new foundation for data security", May 20057 pages.*

Sushil Jajodia et al. "enforcing primary key requirements in multilevel relations", proc.4th RADC workshop on multilevel database security, Apr. 1991, 7 pages.*

Alastair R. Beresford et al. "location privacy in pervasive computing", IEEE CS and IEEEcommunications society, 2003, pp 46-55.*

Alexandre Evfimevski et al. "limiting privacy breaches in privacy preserving data mininig", symposium on principles of database systems, proceedings of the twenty-second ACM SIGMOD, 2003, pp 21-222.*

Paul Ashley et al. "E-P3P privacy policies and privacy authorization", workshop on privacy in the electronic socienty, proceedings of the 2002 ACM workshop on privacy in th eelectronic society, pp 103-109.*

Graham, William, "HotSpots, process, privacy, ", COMP3410, Aug. 2004, 5 pages.*

Agrawal, Rakesh, et al., *Privacy-Preserving Data Mining*, IBM Almaden Research Center, San Jose, CA. ACM SIGMOD, May 2000.

Hundepool, A.J., et al., *u- and t-Argus: Software for Statistical Disclosure Control*, 3rd International Seminar on Statistical Confidentiality, Sep. 26, 1996.

Samarati, P., *Protecting Respondents' Identities in Microdata Release*, IEEE, vol. 13, No. 6, Nov./Dec. 2001.

Sweeney, Latanya, *Datafly: A System for Providing Anonymity in Medical Data*, Database Security XI, Editors: T.Y. Lin and Shelly Qian, 1998.

Whitley, Darrell, *The GENITOR Algorithm and Selection Pressure: Why Rank-Based Allocation of Reproductive Trial is Best*, Computer Science Department, Colorado State University, CO., 1989, pp 116-123.

* cited by examiner

SYSTEM AND METHOD FOR TRANSFORMING DATA TO PRESERVE PRIVACY WHERE THE DATA TRANSFORM MODULE SUPPRESSES THE SUBSET OF THE COLLECTION OF DATA ACCORDING TO THE PRIVACY CONSTRAINT

The U.S. Government has a paid-up license in this invention and the right in limited circumstances to require the patent owner to license others on reasonable terms as provided for by the terms of F30602-01-C-0184 awarded by DARPA.

BACKGROUND OF THE INVENTION

1. Field of the Invention

The present invention relates to managing data, and more particularly to a system and method for transforming data in a manner that satisfies predetermined privacy constraints.

2. Discussion of the Related Art

Information is a corner stone of fields as diverse as medical care and retail sales. For example, information about a hospital patient can include date of birth, social security number, address, next of kin, and medical diagnosis. Consumer profiles collected by businesses/organizations can include identifying and transactional information pertinent to the organization. The amount of information, and in particular the sensitivity of portions of the information, can be a concern for those represented by the information, e.g., consumers.

The information is frequently shared with different parts of the same organization or with other organizations. For example, some portions of medical data may be made part of a public record or shared with public health organizations or with research groups. The information can be used as a commodity, where organizations are willing to pay for the information. Dissemination of the data can be made more agreeable to the individuals and entities represented by the data if some rules governing the dissemination are in place. For example, one proposed method of controlling the dissemination of data constrains the data to a portion of identifying information, which when combined identifies a set of at least k individuals or entities (where k represents the level of privacy). For example, if k is 100, this implies that 100 or more individuals or entities can be described by that same information. Of course, such a privacy requirement can be met by removing all the identifying information but that can also render the data useless. The problem is to satisfy the privacy constraint while retaining useful information. The task of transforming a table to satisfy a privacy constraint is also called anonymization.

At least one proposed method satisfies the privacy constraint by abstracting or suppressing the data selectively. For example, in tabular data where each row represents an individual, and one or more columns comprise explicitly identifying information (e.g., social security numbers), the identifying information can be suppressed or replaced by some randomized value as a place holder.

The notion of a privacy constraint, called k-anonymity, has been formally defined by P. Samarati in the paper "Protecting Respondents Identities in Microdata Release" in the IEEE Transactions on Knowledge and Data Engineering, Vol 13., No. 6, November/December 2001. This specifies that a tabular data set satisfies k-anonymity if any combination of values in any row of the table for the identifying columns appears at least k times in the table. Samarati also defines the operation of abstraction for any potentially identifying column by using a taxonomy of the values for the column. For example, the date of birth can be specified exactly or it could be specified down to the month and year only, or it can be specified to the year of birth only. The information gets less precise as the values are abstracted further. Outliers in the table can also be suppressed. The information in the potentially identifying columns for a suppressed row can be completely masked out. Samarati declares that allowing both abstractions and suppressions has more flexibility leading to better solutions. The information loss due to abstraction is measured using the taxonomy tree for each of the potentially identifying columns. The allowed abstractions are those corresponding to nodes (and corresponding values) all of which are at some chosen level of the taxonomy tree. The difference between the chosen abstraction level and the level corresponding to the leaf nodes of the tree is used to measure the loss of information. The anonymization task is treated as an optimization problem to achieve the privacy level with minimum loss of information (measured using the taxonomy tree as mentioned above) and with no more than a specified number of rows suppressed.

The Datafly system described in DataFly: A System for Providing Anonymity in Medical Data, Proceedings of Database Security XI: Status and Prospects (Chapman and Hall) by Latanya Sweeney is an example of a system that uses abstraction and suppression to perform anonymization to achieve a specified k-anonymity level of privacy. The Datafly system also uses the notion of the taxonomy trees for the potentially identifying columns. The optimization problem is supposedly solved using a simple greedy heuristic that does not explore the full range of possible solutions.

Another system that uses abstractions and suppressions to anonymize is the µ-argus system described by A. J. Hundepool and L. C. R. J. Willenborg in Software for Statistical Disclosure Control presented at the 3rd International Seminar on Statistical Confidentiality, 1996. Since only 2- and 3-combinations of potentially identifying column values are considered the solutions produced by this system can be less than optimal.

An alternative approach to the use of abstractions and suppressions is to disturb the data ensuring that some statistical properties are satisfied. The work by Agrawal and Srikant, Privacy-Preserving Data Mining, in the Proceedings of the ACM SIGMOD Conference on Management of Data, May 2000, is a work of this type. The distortion method compromises the content of each specific piece of data (each row in the table). This precludes deriving any insights on relationships between the column values of any row once the values are distorted.

However, no system or method is known to exist for applying a targeted transformation according to a desired implementation. Therefore, a need exists for a system and method for transforming data according to a predetermined privacy constraint.

SUMMARY OF THE INVENTION

According to an embodiment of the present invention, a data transform system comprises a processor, a memory connected to the processor, storing a collection of data, and a data transform module, accepting two data constraints and the collection of data from memory, wherein a first constraint is a usage constraint and a second constraint is a privacy constraint, the data transform module transforming the collection of data according to the usage constraint and the privacy constraint.

The collection of data is a data base. The collection of data comprises a meta data portion comprising information about the collection of data, and a tabular data portion comprising a plurality of attributes. The tabular data portion is organized by rows or columns.

The usage constraint determines a subset of data from the collection of data. The privacy constraint abstracts the data collection. The privacy constraint suppresses the data collection. The privacy constraint defines a minimum population that can be identified by an output of the data transform module.

According to an embodiment of the present invention, a method for constraining data comprises determining, for a collection of data, a level of granularity, determining an application specific constraint, determining a metric according to the level of granularity, the application specific constraint, and constraining the collection of data according to the metric.

The method comprises abstracting and suppressing values for an identifying attribute in the collection of data, wherein the collection of data comprises a meta data portion specifying the identifying attribute.

A categorical identifying attribute is abstracted according to values in a corresponding taxonomy tree. A numeric identifying attribute is abstracted to a set of disjoint intervals that cover values in the collection of data.

The method further comprises determining a data loss, according to the metric, in the collection of data according to the application constraint.

Constraining the collection of data comprises minimizing the data loss. Constraining comprises minimizing the data loss according to a genetic algorithm.

The application constraint specifies at least one target attribute for which a predictive model is generated. A plurality of identifying attributes are grouped according to values, wherein the metric aggregates a variability in the values for each target attribute within a group. The variability for a numeric target attribute is determined as the sum of absolute deviations between a representative value for the group and values for the numeric target attribute within the group. The variability for a categorical target attribute is determined as a number of categories in a group with a value for the categorical target attribute different from a majority value in the group.

The application constraint specifies a weight for an identifying attribute of the data. The method comprises determining a weighted sum of data loss over the collection of data. The data loss for an identifying attribute depends on a type of attribute and is determined as an average loss for each entry for that attribute. The data loss for a numeric type attribute entry is a width of an abstracted interval. The data loss for a categorical attribute type entry is based on an ambiguity in an abstracted value from a taxonomy tree.

According to an embodiment of the present invention, a program storage device is provided, readable by machine, tangibly embodying a program of instructions executable by the machine to perform method steps for constraining data. The method steps comprising determining, for a collection of data, a level of granularity, determining an application specific constraint, determining a metric according to the level of granularity, the application specific constraint, and constraining the collection of data according to the metric.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
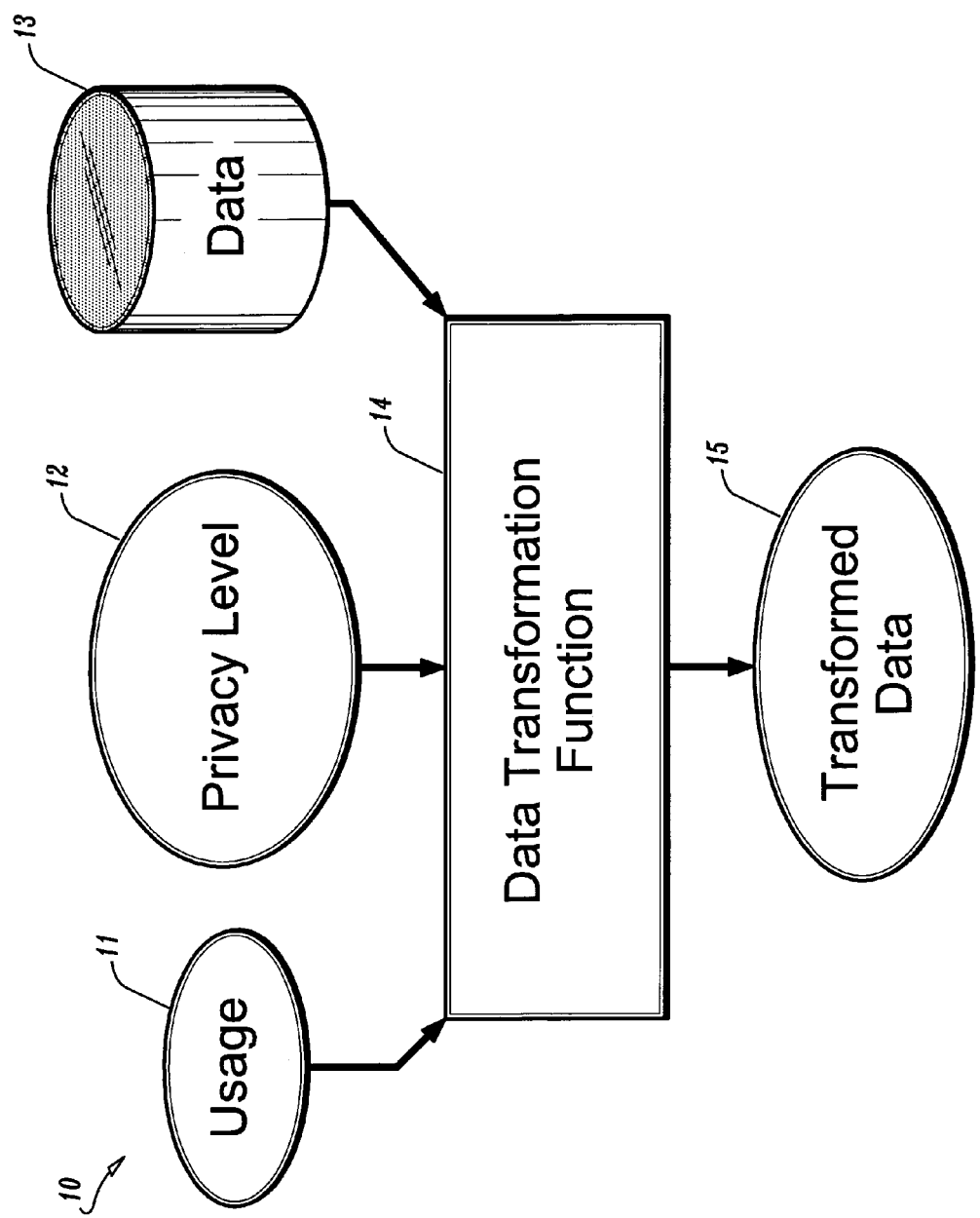
FIG. 1 illustrates the block diagram of the system proposed by the present invention to transform data to preserve privacy according to an embodiment of the present invention.

As illustrated in FIG. 1, the present invention implements a system 10 for transforming data, wherein transformed data satisfies a specified privacy level and is optimized for the specified usage. Optimization comprises reducing the loss of information for the specified implementation as compared to prior art system. The system 10 determines a data transformation function 14 according to a targeted usage 11 for the transformed data and a desired privacy level 12. A transformation satisfying the specified privacy level can result in loss of information from the input data 13. The privacy level can be specified as a number k. The number k implies that the transformed data needs to have as a property, any combination of all values comprising potentially identifying information in it can only be narrowed to a set of at least k individuals or entities. The input data 13 to be transformed is processed against the data transformation function 14 to determine the transformed data 15. An example of the data 13 is illustrated in FIG. 2.

Figure 2:
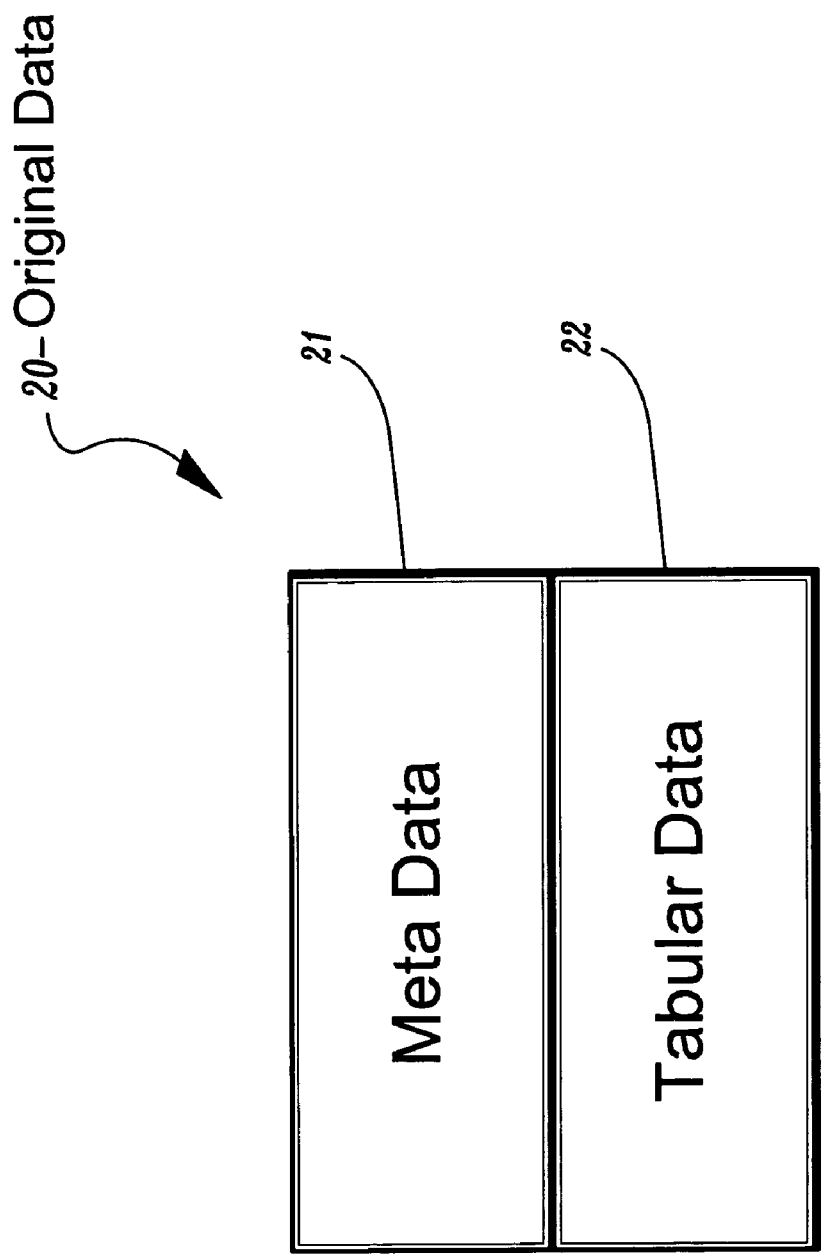
FIG. 2 shows the two components (meta-data, tabular data) of the data to be transformed according to an embodiment of the present invention.

Referring to FIG. 2, data 20 comprises meta-data 21 and tabular data 22. The meta-data 21 comprises information about the input data. This includes the name and type of information in each column. For example, a column comprising a current age of a person in whole years, represented as an integer. Some columns like a zip code of a person's residence can have a categorical value. For such columns the meta-data can comprise taxonomy information on how to abstract the values. Consider an example column comprising zip codes with the values 10566, 10567, 10571, and 10572. An example of taxonomy information for this column is illustrated in FIG. 3.

Figure 3:
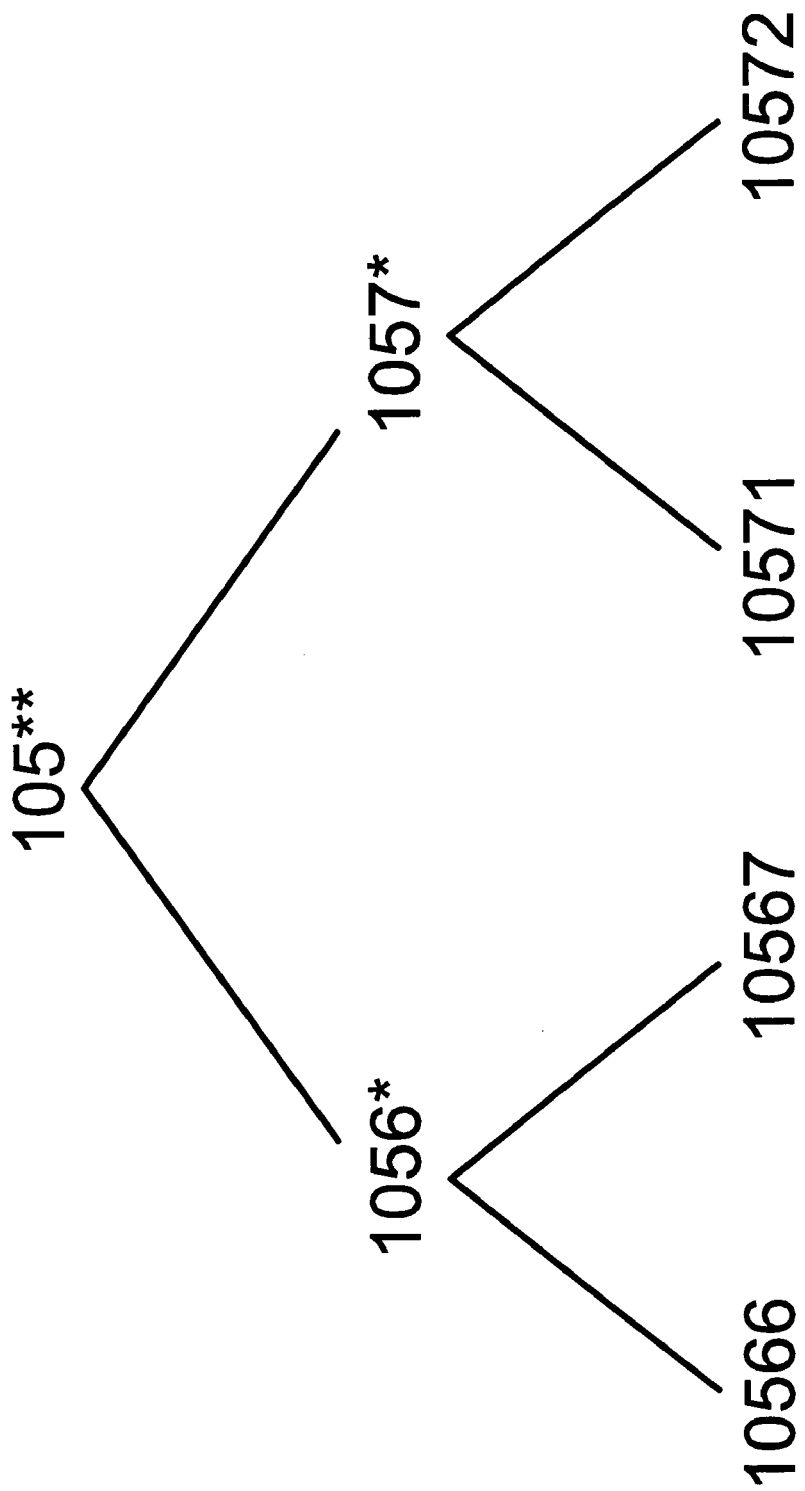
FIG. 3 illustrates an example of the taxonomy information provided in the meta-data for a column comprising categorical data according to an embodiment of the present invention.

The tree organization depicted in FIG. 3 shows how a zip code value in a column can be abstracted. For example, 10566 can be abstracted to 1056* or it can be further abstracted to 105. For any leaf node in the taxonomy tree, following the path to the root node determines the possible abstractions for the value in the leaf node. The value becomes more abstracted, conveying less information, closer to the root node of the taxonomy tree. The meta-data also comprises information on which columns are potentially identifying and need to be abstracted or suppressed according to privacy constraints. Further, there can be other tags for columns that pertain to the usage of the table. For example, a particular column can be tagged as one for which a predictive model will be developed. If this column comprises categorical values, a classification model would be an appropriate predictive model. For a column with numeric values, a regression model would be an appropriate predictive model. The tabular data 22** can comprise rows that correspond to individuals or entities being described in the data and columns corresponding to the various attributes of these individuals or entities. This tabular view of the data does not imply or restrict the application to just single tables (in the database sense). The tabular data can be the result of database operations, e.g., joins, on multiple database tables.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Considering FIG. 1, the three inputs discussed above can be used by the data transformation function 14 to produce the transformed data 15 as output. The transformed data 15 comprises abstracted or suppressed data for the potentially identifying columns in the input data 13. Explicitly identifying data such as social security numbers can be replaced by randomized place holders. Columns that do not impart identifying information can be copied from the input data into the transformed data. A row in the input data that is suppressed in the transformed data will have all the information in the identifying columns removed or blanked out. An identifying column can be abstracted. For abstraction the transformed table comprises the abstracted value for that column in any row that is not suppressed. The allowable abstractions represent a significant advance due to their generality when compared with the prior art in this area.

For an identifying column comprising numeric information a general form of abstraction can be used. For example, consider a numeric column that can have values ranging from the minimum value, L to the maximum value U. A partition of all the values in the range from L to U into disjoint intervals represents an allowable abstraction for a numeric column. The intervals define the abstraction and each interval can be specified by a lower bound and an upper bound. The value of a numeric column in a non-suppressed row can be replaced by the abstracted interval in the transformed data. The abstracted interval can be denoted in the transformed data by a representative value for the interval. The median of all the values encountered in the table within an interval can be used as a representative value. According to another embodiment, a symbolic value can be used to denote the interval in the transformed table. The symbolic value can capture the interval definition using its lower and upper bounds. Since any value for this identifying column should be abstracted to a unique interval, intervals need to be disjoint. Therefore, a common end point of two adjacent intervals is included in exactly one of the two intervals.

For an identifying column that comprises categorical information the present invention allows a more general form of abstraction when compared to the prior art. For the abstractions considered in the present invention all leaves of the taxonomy tree may not be abstracted to nodes, e.g., values, at the same level of the tree. The chosen abstracted values are represented by nodes chosen in the taxonomy tree so that some properties are satisfied. A valid abstraction has to satisfy the property that for each value as represented by a leaf node in the taxonomy tree there is a unique chosen node along the path to the tree root that represents its abstracted value. For example, consider the taxonomy in FIG. 3. The present invention would allow the abstraction where zip codes 10566 and 10567 are abstracted to 1056*, while zip codes 10571 and 10572 are retained without abstraction. The transformed table can have symbolic values that denote the abstracted value for these columns.

Figure 4:
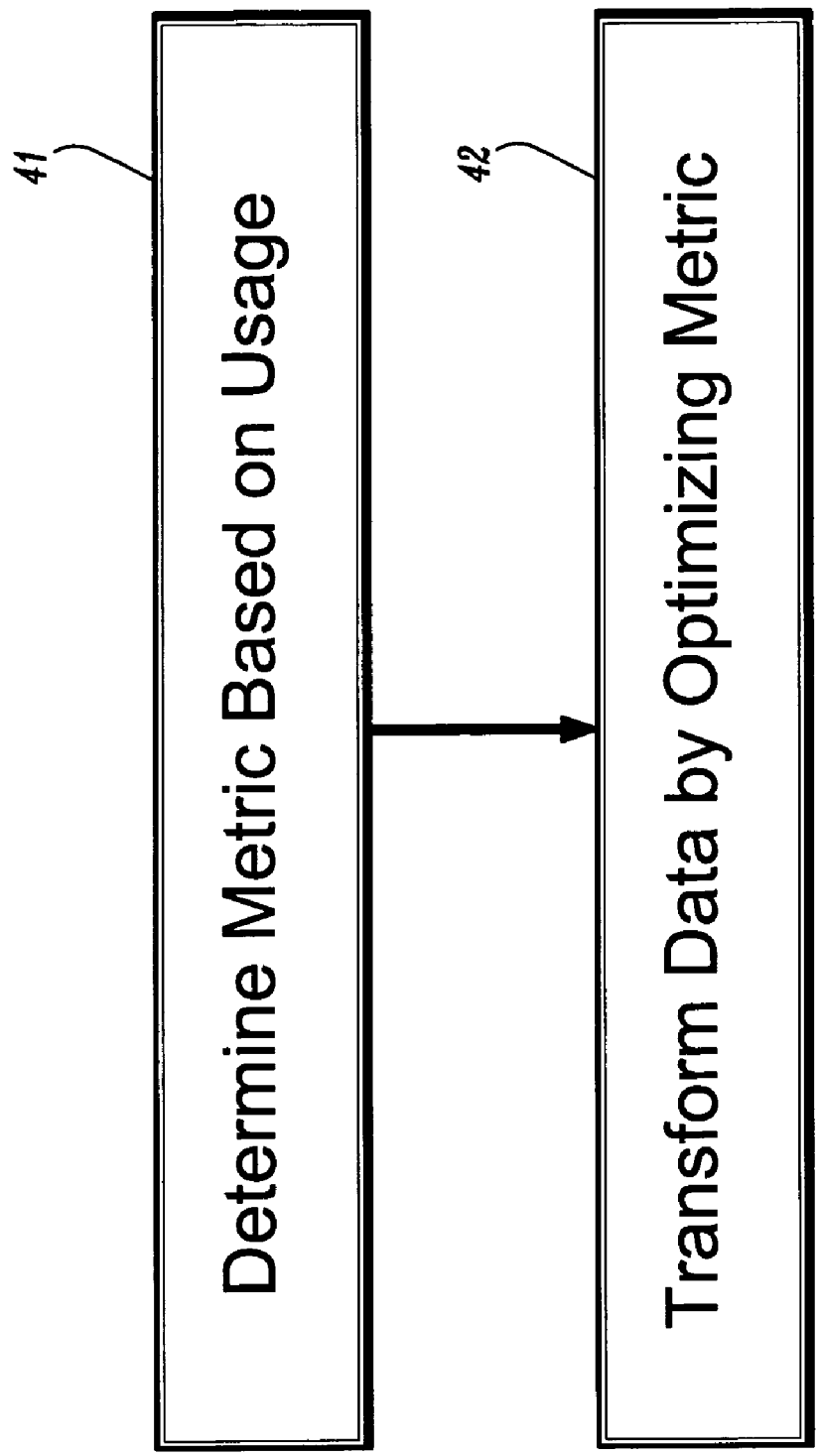
FIG. 4 details the two steps of the data transformation function according to an embodiment of the present invention.

The data transformation function 14 in FIG. 1 is a method, wherein the method can be depicted as shown in FIG. 4. The method determines a metric based on the usage of the transformed data as specified to the system 41. The method transforms the data by optimizing this metric while adhering to the privacy constraints 42.

According to an embodiment of the present invention, data transformation can be tailored to a specified implementation. Determining the metric 41 in FIG. 4 makes this possible.

Consider a general implementation where the transformed table has multiple uses that may not be all known at the time of transformation. For this case the columns can be treated as being equally important and the metric can sum the loss of information in each identifying column. Column weights can be determined. The weights can represent the column's relative importance for the specified implementation. The weights can be used to determine a weighted sum of information loss over the columns. The information loss for each identifying column can be measured using any column metric that captures the loss due to abstraction and suppression.

The metric for the loss in an identifying column can depend on the type of information in the column. Consider a value N in a numeric column that is abstracted to an interval [lower,upper] with a representative value R. The information loss due to this abstraction can be determined by interval range [upper-lower] that can be normalized by dividing the difference by the total range for this column (U-L). Upper and lower can be replaced by the smallest and largest values within this interval that are present in the original table. A suppressed value can be considered to be abstracted to the largest interval of uncertainty for that identifying column. This interval is [upper-lower] if the range of column values is specified by the minimum and maximum values L and U. The information loss for a numeric value N can be measured as an error in terms of the deviation of the value N in the original table to the representative value R in the transformed table. The information loss for a numeric column's value N can be used to define that column's metric for the entire table. The column metric can be computed by summing the abstraction and suppression loss for the value in that identifying column for each row in the table. This summed value can be optionally normalized by the number of rows in the table.

Consider a value V in a categorical column that is abstracted to a node P in the taxonomy tree T for that column. Let the total number of distinct values for this categorical column be M and the number of distinct values for which P is on the path to the root in the tree T be L. In a preferred embodiment the loss of information for this value V is measured by the ambiguity in the abstracted value corresponding to node P using the formula $(L-1)/(M-1)$. This is based on the loss of information for the value V depending only on the size of ambiguity set and not on the elements in the ambiguity set. If the value V is suppressed, its ambiguity set can be viewed as the entire set of values for that column. The loss of information for a suppressed value can be 1. The loss of information can depend on the elements of the ambiguity set if a model is provided that specifies the information loss for any value in the ambiguity set for each value V. The column metric can be determined by summing the abstraction and suppression loss for the value in that column for each row in the table. The summed value can be optionally normalized by the number of rows in the table.

Consider another usage where the transformed table will be used to generate a predictive classification model for a categorical column C. A classification model for column C can predict the value in column C for a row using the values for other columns. Such models have wide ranging applications in various domains like marketing and health care. An example in the marketing domain involves data being collected by retailers. For each customer, a retailer may have profile information about the customer and also detailed transaction information over some period of time. Customers can be classified into two or more segments based on their price sensitivity, e.g., ranging from most price conscious to least. These segments can be targeting their total purchases or purchases in some product category, e.g., products made by a particular consumer products company. It is of interest to the retailer and to the manufacturer to try and predict the customer segment based on their profile. The profile can comprise potentially identifying information which the retailer may be required to anonymize before providing to other entities, e.g., manufacturer. The present invention can be applicable for this task and the usage specified to the system can reflect the desire to build a classification model for the customer segment in this example. The metric for this usage can be determined, where the metric measures the ambiguity in the value of the categorical column C due to the abstraction and suppression in the transformed table.

Each row in the transformed table can be identified with its group that is defined by a unique combination of values for the potentially identifying columns. Consider a particular row R and denote its group by G. Let the set of all rows in the group G be denoted by Rg. Examine all the rows in the set Rg to determine the value in column C that occurs the most number of times. This can be called the majority value for the set Rg and will be denoted by Vg. The contribution to the information loss metric for a not suppressed row R is 1 if the value in column C for this row R is not the majority value Vg and is 0 otherwise. The contribution to the metric for a suppressed row can be 1. The metric can optionally be normalized by number of rows in the table.

Consider another usage where the transformed table will be used to generate a predictive model for a numeric column C. A regression model for column C would predict the value in column C for a row using the values for other columns. Such models also have wide ranging applications in various domains like marketing and health care. Using the example in the marketing domain introduced earlier, for each customer, a retailer may have profile information about the customer and also detailed transaction information over some period of time. Customers may be characterized by the spending. This spending of interest could be their total purchases or purchases in some product category, e.g., products made by a particular consumer products company. It is of interest to the retailer and to the manufacturer to try and predict the customer spending based on their profile. The profile can comprise potentially identifying information which the retailer may be required to anonymize before providing to other entities, e.g., a manufacturer. The present invention would be applicable for this task and the usage specified to the system should reflect the desire to build a regression model for the customer spending column in this example. The metric for this usage is defined so that it measures the variability in the value of the numeric column C due to the abstraction and suppression in the transformed table.

Each row in the transformed table is identified with its group which is defined by a unique combination of values for the potentially identifying columns. Consider a particular row R and denote its group by G. Let the set of all rows in the group G be denoted by Rg. Determine the median of the values in column C for all the rows in Rg. Denote this median value by Mg. In a preferred embodiment the contribution to the information loss metric for a non-suppressed row R is the absolute difference between value in the numeric column C for this row and the median Mg. For a suppressed row the contribution could be computed in the same way by taking the absolute difference between the value in column C and the median value for column C over the group of all suppressed rows. Alternatively, for a suppressed row the contribution could be computed by taking the absolute difference between the value in column C and the median value for column C over the entire table. The contributions for the rows are added up to determine the metric for this usage. In a preferred embodiment the summed metric can be normalized by the metric that would result if all the rows were in a single group.

Combinations of the individual implementations considered above are allowed as possible usage input 11 to the system as shown in FIG. 1. The metric for a combined usage can be determined by combining the metrics for the individual implementations. The normalized metrics can be combined using a weighted sum where the weights represent importance of the individual implementations as specified by the user. In the absence of these importance weights the individual implementations can be taken to be equally important.

Block 42 in FIG. 4 of the data transformation function performs the transformation by optimizing the metric while adhering to the privacy constraints. This block can be performed using any optimization process that explores the space of possible abstractions and suppressions as defined earlier. The block can be performed by mapping the problem into a genetic algorithm framework to optimize the metric and find a solution.

A bit vector (also called a chromosome) in the genetic algorithm framework can be used to represent a possible abstraction solution. Each of the potentially identifying columns in the table has a bit vector associated with it. The chromosome is produced by the concatenation of these bit vectors for each potentially identifying column. These columns can be in any order in the concatenation as long as the bit vector corresponding to any potentially identifying column can be determined and extracted from the chromosome. The bit vector for a potentially identifying column depends on the type information of column as described next.

For a numeric column, the number of bits in its bit vector depends on the granularity at which the intervals are defined for abstracting values in this column. Each value that can be used as an end point of an interval has a unique bit in the bit vector. These bits are ordered in the order of the numeric values they represent. In one embodiment each unique value for this numeric column that is encountered in the original table is considered a potential end point for the intervals. In another embodiment the possible end points are chosen by picking a representative value in between every pair of adjacent values encountered in this column in the original table. In one embodiment this representative value could bisect the interval defined by the corresponding adjacent values. In another embodiment, numeric values are chosen as possible end points by a separate process like scalar quantization and a bit is assigned to each chosen end point again in the order of the values. For example, consider a numeric column whose values range from 0 to 50. Let the possible interval end points be 10, 20, 30 and 40. The bit vector for this column has 4 bits which will represent these end points in order. A value of 1 in a bit position implies that the corresponding value is used as an end point for the abstraction intervals. For this example, the bit vector 0110 represents the abstraction {[0,20), [20, 30), [30, 50]}. This comes about because only the second value (20) and the third value (30) are chosen as end points (the corresponding bits are 1 in the bit vector).

Figure 5:
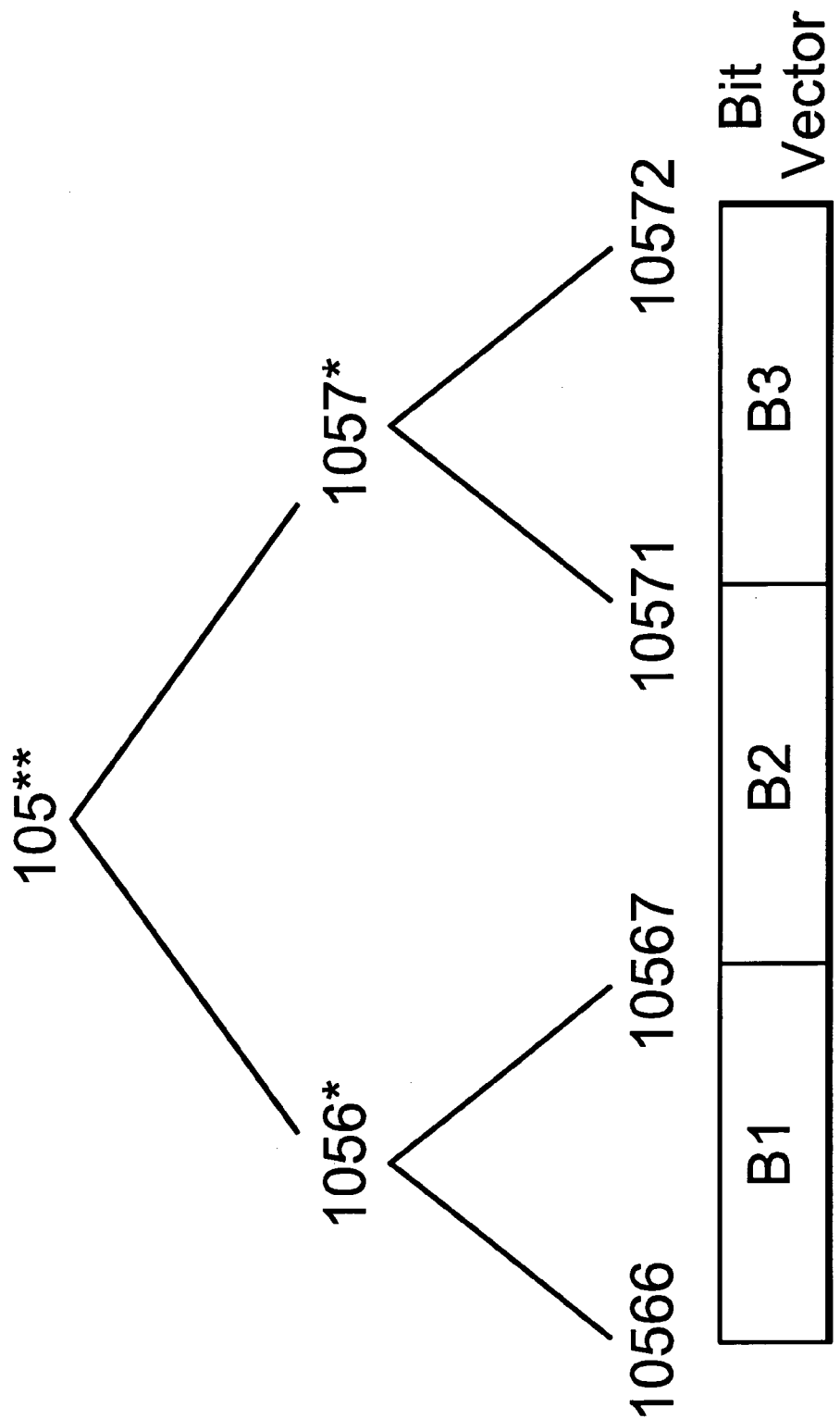
FIG. 5 uses example of taxonomy tree introduced in FIG. 3 to show the mapping from it to the corresponding bit vector for the chromosome according to an embodiment of the present invention.

For a categorical column, the number of bits needed is one less than the number of nodes in the taxonomy tree at some chosen level. In a preferred embodiment this chosen level is the leaf level (i.e., the lowest level). FIG. 5 repeats the example of the taxonomy tree that was presented in FIG. 3 and shows the three bits B1, B2, and B3 that constitute the bit vector for this taxonomy tree at the leaf level. Consider the abstraction for this column where values 10566 and 10567 are abstracted to the node in the taxonomy tree 1056* and the values 10571 and 10572 are left as is. The bit vector representation for this abstraction is {B1, B2, B3}=011. A 1 in a bit position indicates that values on both sides of that bit position are not abstracted to some common value. Since values 10566 and 10567 are abstracted to the same value 1056* the first bit B1 is 0. Other bits (B2 and B3) are 1 because 10571 and 10572 are separated from each other and from 1056* in this abstraction. For any valid abstraction the bit vector representation can be determined in this fashion. Note that not all the bit vector values represent valid abstractions as defined earlier. An abstraction is represented by marking a set of nodes in the taxonomy tree that represent the abstracted levels for the various leaf nodes. A valid abstraction must have the property that the path from any leaf node to the root of the taxonomy tree must encounter exactly one abstraction node. The bit vectors that correspond to these valid abstractions are considered as valid bit vectors for a taxonomy. The only valid bit vectors for the example in FIG. 5 are 000, 010, 110, 011, 111. The bit vector 001, for example, does not correspond to a valid abstraction for this taxonomy tree.

Using this mapping from an abstraction to the binary chromosome allows the use of a genetic algorithm to find a chromosome and the corresponding transformation of the original table that optimizes the chosen metric. The genetic algorithm can use operations like crossover and mutation to explore the space of possible solutions with the goal of optimizing (e.g., minimizing) the metric. This can be done in an iterative process where each iteration in this framework is referred to as a generation. The GENITOR algorithm as described by D. Whitley in "The GENITOR algorithm and Selective Pressure" in the Proceedings of the 3rd International Conference on Genetic Algorithms can be used for this task. Alternatively any standard genetic algorithm can be used for this task. Since only a subset of the bit vectors values are valid for categorical columns the genetic algorithm chosen has to be modified as described next. When a new chromosome is generated by the use of operations like crossover and mutation an extra step has to be performed to make it valid. This can be done by making each of the bit vector segments that correspond to categorical columns valid. For each such bit vector segment the bit vector value is modified to a valid value that is similar to the original value. If the original value is valid it is left unchanged. An invalid value is altered using the taxonomy tree for the corresponding column. Bits in the bit vector that separate nodes that are closer to each other in the tree are considered before bits that separate nodes further apart. For each group of bits is considered and altered to valid values close to the original invalid values. Each bit is altered only once in this process.

Figure 6:
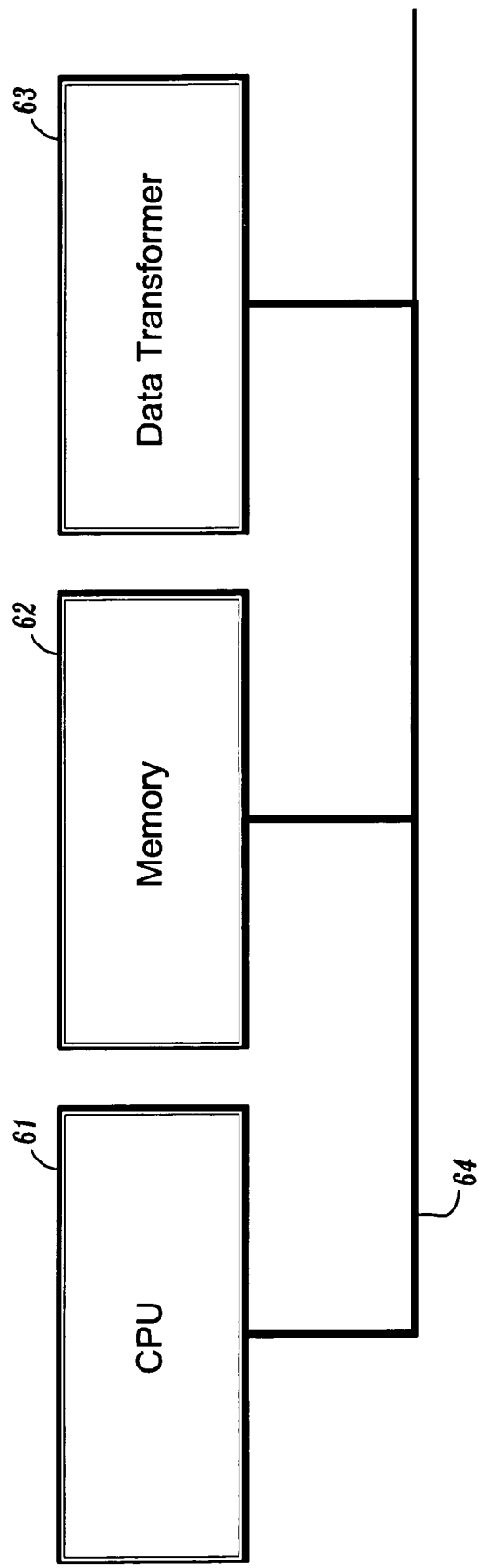
FIG. 6 is a diagram of a data transform system according to an embodiment of the present invention.

Referring to FIG. 6, a data transform system for constraining a collection of data can include, a processor 61 connected to a memory 62 and a data transformer 63, by a bus 64. The data transformer can be a system comprising a processor and a memory separated from the data transform system. Alternatively, the data transformer can be stored as a program in the system's memory 62. The processor can execute the program stored in memory. The bus 64 can also be connected to, for example, a data base for storing the collection of data, an input device such as a keyboard, a display and another bus.

Having described embodiments of a system and method for transforming data in a manner that satisfies imposed privacy constraints, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A data transform system comprising:
 a processor;
 a memory connected to the processor, storing a collection of data; and
 a data transform module, accepting a usage constraint, a privacy constraint and the collection of data from memory, the data transform module transforming the collection of data according to the usage constraint and the privacy constraint, wherein the usage constraint defines a subset of the collection of data, and wherein the data transform module suppresses the subset of the collection of data according to the privacy constraint, the privacy constraint defining a minimum number of entities in a subset of the collection of data, wherein any combination of all values of a suppressed collection of data output by the data transform module can be narrowed to the subset having at least the minimum number of entities in the collection of data.

2. The data transform system of claim 1, wherein the collection of data is a data base.

3. The data transform system of claim 1, wherein the collection of data comprises:

a meta data portion comprising information about the collection of data; and a tabular data portion comprising a plurality of attributes corresponding to the collection of data.

4. The data transform system of claim 3, wherein the tabular data portion is organized by rows or columns.

5. The data transform system of claim 1, wherein the usage constraint identifies the subset of data from the collection of data.

6. The data transform system of claim 1, further comprising abstracting the data according to the privacy constraint.

7. The data transform system of claim 6, wherein the data is a serial number and the privacy constraint defines an abstraction of the data as a maximum number of digits of the serial number that can be revealed in the suppressed data.

8. The data transform system of claim 1, wherein the usage constraint defines a weight for each data type of the collection of data.

9. A computer-implemented method for constraining data comprising the steps of:

determining, for a collection of data, a level of granularity, wherein the level of granularity is a minimum number of entities in a set to which any combination of values in a constrained collection of data can be narrowed;

determining an application specific constraint, wherein the application specific constraint defines a subset of the collection of data;

determining a metric including a combination of an abstraction and/or a suppression of the subset of the collection of data, wherein the metric satisfies the level of granularity;

constraining the collection of data according to the metric; and providing a constrained collection of data to a client.

10. The computer-implemented method of claim 9, wherein the step of constraining the collection of data further comprises the step of abstracting and suppressing values for an identifying attribute in the collection of data, wherein the collection of data comprises a meta data portion specifying the identifying attribute.

11. The computer-implemented of claim 10, wherein a categorical identifying attribute is abstracted according to values in a corresponding taxonomy tree.

12. The computer-implemented of claim 10, wherein a numeric identifying attribute is abstracted to a set of disjoint intervals that cover values in the collection of data.

13. The computer-implemented of claim 10, further comprising the step of determining a data loss, according to the metric, in the collection of data according to the application constraint.

14. The computer-implemented of claim 13, wherein the step of constraining comprises minimizing the data loss.

15. The computer-implemented of claim 13, wherein the step of constraining comprises minimizing the data loss according to a genetic algorithm.

16. The computer-implemented of claim 9, wherein the application constraint specifies at least one target attribute for which a predictive model is generated.

17. The computer-implemented of claim 16, wherein a plurality of identifying attributes are grouped according to values, wherein the metric aggregates a variability in the values for each target attribute within a group.

18. The computer-implemented of claim 17, wherein the variability, for a numeric target attribute is determined as the sum of absolute deviations between a representative value for the group and values for the numeric target attribute within the group.

19. The computer-implemented of claim 17, wherein the variability for a categorical target attribute is determined as a number of categories in a group with a value for the categorical target attribute different from a majority value in the group.

20. The computer-implemented of claim 9, wherein the application constraint specifies a weight for an identifying attribute of the data.

21. The computer-implemented of claim 20, further comprising the step of determining a weighted sum of data loss over the collection of data.

22. The computer-implemented of claim 21, wherein the data loss for an identifying attribute depends on a type of attribute and is determined as an average loss for each entry for that attribute.

23. The computer-implemented of claim 22, wherein the data loss for a numeric type attribute entry is a width of an abstracted interval.

24. The computer-implemented of claim 22, wherein the data loss for a categorical attribute type entry is based on an ambiguity in an abstracted value from a taxonomy tree.

25. A program storage device readable by machine, tangibly embodying a program of instructions executable by the machine to perform method steps, for constraining data, the method steps comprising:

determining, for a collection of data, a level of granularity, wherein the level of granularity is a minimum number of entities in a set to which any combination of values in a constrained collection of data can be narrowed;

determining an application specific constraint, wherein the application specific constraint defines a subset of the collection of data;

determining a metric including a combination of an abstraction and/or a suppression of the subset of the collection of data, wherein the metric satisfies the level of granularity;

constraining the collection of data according to the metric; and providing a constrained collection of data to a client.

* * * * *